United States Patent
Weisser

(10) Patent No.: US 9,490,676 B2
(45) Date of Patent: Nov. 8, 2016

(54) FAN HAVING AN INTEGRATED IP PROTECTION

(75) Inventor: Michael Weisser, Elzach (DE)

(73) Assignee: EBM-PAPST ST. GEORGEN GmbH & Co. KG, St. Georgen (DE)

( * ) Notice: Subject to any disclaimer, the term of this patent is extended or adjusted under 35 U.S.C. 154(b) by 3401 days.

(21) Appl. No.: 10/506,477

(22) PCT Filed: Feb. 11, 2003

(86) PCT No.: PCT/EP03/01312

§ 371 (c)(1),
(2), (4) Date: Sep. 1, 2004

(87) PCT Pub. No.: WO03/075433

PCT Pub. Date: Sep. 12, 2003

(65) Prior Publication Data

US 2005/0123423 A1 Jun. 9, 2005

(30) Foreign Application Priority Data

Mar. 2, 2002 (DE) .............................. 202 03 421 U

(51) Int. Cl.
- F04B 35/04 (2006.01)
- H02K 5/128 (2006.01)
- F04D 29/08 (2006.01)

(Continued)

(52) U.S. Cl.
CPC ............. *H02K 5/128* (2013.01); *F04D 25/062* (2013.01); *F04D 25/0646* (2013.01); *F04D 29/083* (2013.01); *H02K 11/33* (2016.01); *H02K 1/187* (2013.01); *H02K 7/14* (2013.01)

(58) Field of Classification Search
USPC .................. 417/423.1, 423.11, 423.14, 313, 417/423.15, 423.3, 354; 310/86, 90, 67 R, 310/88
See application file for complete search history.

(56) References Cited

U.S. PATENT DOCUMENTS

| | | | |
|---|---|---|---|
| 3,588,284 A | 6/1971 | Sturlason et al. | ............ 417/201 |
| 4,008,422 A | 2/1977 | Sodekoda et al. | ............ 310/138 |

(Continued)

FOREIGN PATENT DOCUMENTS

| | | |
|---|---|---|
| DE | 16 28 212 | 2/1971 |
| DE | 26 13 984 | 5/1978 |

(Continued)

OTHER PUBLICATIONS

"Modes of protection as per DIN VDE 0470-1 (EN 60529)," LAPP USA, Florham Park, NJ, found Aug. 2004 at webpage www.lappusa.com/catalog/TechData-IPRatings.HTM (pp. 1-2).

(Continued)

*Primary Examiner* — Gerald L Sung
(74) *Attorney, Agent, or Firm* — Milton Oliver; Oliver Intellectual Property

(57) ABSTRACT

A fan has a fan housing (2) which is formed with a pot-shaped recess (4) and it has an external-rotor drive motor (103) having an internal stator (22) and an external rotor (34), separated from each other by an air gap (52). The internal stator (22) is mounted on a bearing support tube (24) which is connected to a base part (46). The arrangement of bearing support tube (24) and base part (46) form, together with the pot-shaped recess portion (4) of fan housing (2), a substantially fluid-tight annular space (54) enclosing the inner stator (22). A wall (56) defining this annular space (54) extends in the manner of a canned motor through the air gap (52) between inner stator (22) and external rotor (34).

19 Claims, 9 Drawing Sheets

Figure 1:
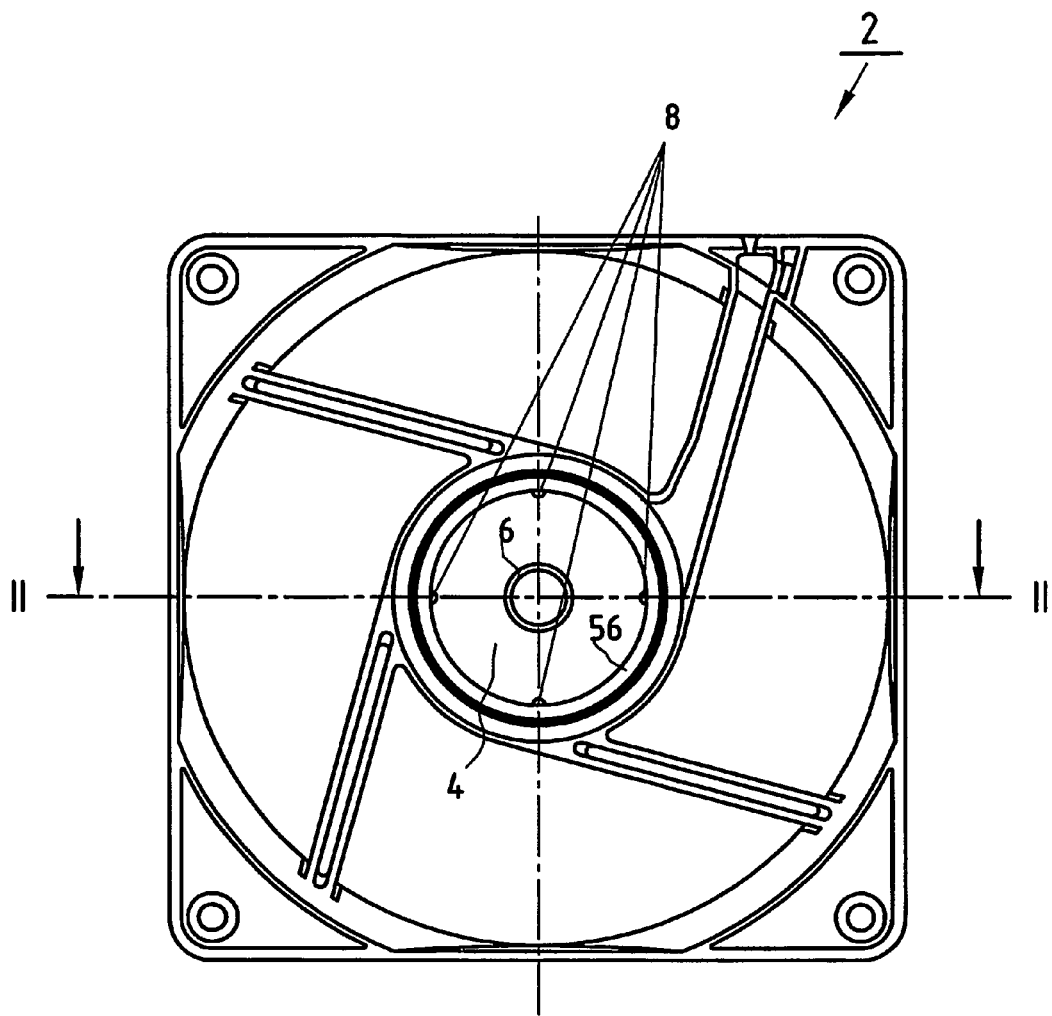

(51) Int. Cl.
 *F04D 25/06* (2006.01)
 *H02K 1/18* (2006.01)
 *H02K 7/14* (2006.01)

(56) References Cited

U.S. PATENT DOCUMENTS

| | | | |
|---|---|---|---|
| 4,482,124 A | 11/1984 | Dochterman | 248/604 |
| 4,554,473 A | 11/1985 | Müller et al. | 310/67 R |
| 4,554,491 A | 11/1985 | Plunkett | 318/254 |
| 4,682,065 A | 7/1987 | English et al. | 310/90 |
| 4,698,542 A | 10/1987 | Müller et al. | 310/67 R |
| 4,832,576 A | 5/1989 | Deguchi et al. | 417/45 |
| 5,066,194 A | 11/1991 | Amr | 415/223 |
| 5,215,438 A | 6/1993 | Chou et al. | 415/223 |
| 5,354,177 A | 10/1994 | Chang | 416/219 A |
| 5,616,975 A | 4/1997 | May et al. | 310/89 |
| 5,650,676 A * | 7/1997 | Blumenberg | 310/88 |
| 5,650,678 A * | 7/1997 | Yokozawa et al. | 310/90 |
| 5,786,647 A | 7/1998 | Vollmer et al. | 310/89 |
| 5,946,161 A | 8/1999 | Schuh | 360/97.03 |
| 5,973,424 A | 10/1999 | Engelberger et al. | 310/43 |
| 5,979,541 A * | 11/1999 | Saito | 165/80.3 |
| 6,126,417 A | 10/2000 | Roth | 417/423.7 |
| 6,198,189 B1 | 3/2001 | Takahashi | 310/89 |
| 6,225,722 B1 | 5/2001 | Rupp et al. | 310/91 |
| 6,278,207 B1 | 8/2001 | Matsumoto et al. | 310/88 |
| 6,465,916 B1 | 10/2002 | Aoshima | 310/49 R |
| 6,474,959 B2 | 11/2002 | Eisert | 417/360 |
| 6,507,135 B1 | 1/2003 | Winkler | 310/91 |
| 7,362,021 B2 | 4/2008 | Huang et al. | 310/88 |
| 2004/0256933 A1 | 12/2004 | Toyokawa et al. | 310/89 |
| 2005/0012416 A1 | 1/2005 | Huang et al. | 310/88 |

FOREIGN PATENT DOCUMENTS

| | | |
|---|---|---|
| DE | 89 09 737 | 8/1989 |
| DE | 94 04 147 | 4/1994 |
| DE | 29707440 U | 6/1997 |
| DE | 297 18 255 U | 11/1997 |
| DE | 199 07 556 | 3/2000 |
| DE | 200 12 673 U1 | 12/2000 |
| DE | 200 19 289 U | 1/2001 |
| DE | 200 19 289 U1 | 1/2001 |
| DE | 100 01 047 A1 | 7/2001 |
| EP | 0 591 093 A | 4/1994 |
| EP | 1 076 398 A2 | 2/2001 |
| GB | 2 361 998 | 11/2001 |
| JP | 3-077 710 A | 5/2001 |
| TW | 441897 Y | 6/2001 |
| WO | WO 00-13294 | 3/2000 |

OTHER PUBLICATIONS

"Environmental ratings for enclosures based on Ingress Protection (IP) Code designations," Underwriters' Laboratories, found Aug. 2004 at webpage www.ul.com/hazloc/ref/ingress.htm.
U.S. Appl. No. 09/716,745, Huang et al.
Elektrosil, Exhibit NB 8 in EU litigation against EBM-PAPST St. Georgen, pp. 1-5, undated.
de.wikipedia.org, "Dichtung (Technik)" encyclopedia entry retrieved Aug. 23, 2011, pp. 1-3 with citations.
Wikipedia.org, "O-Ring," encyclopedia entry retrieved Dec. 13, 2011, pp. 1-7 with citations.
Papst, "Equipment Fans for AC Operation," catalog L726a, pp. 59, 60, 68 (undated).
New Encyclopedia Brittanica, 15$^{th}$ Edition (1997), Arc-Welding article on p. 568 (1 page).
Exhibit K19, English Translation of TW 441 897, p. 4, Line 15 to p. 5, Line 4 (2 pages).
Exhibit K20, Machine Translation of JP3-077710-A, Moisture-Proof Device for Motor, pp. 1-3 (undated).
Int'l Conference on Power Engineering; Conference Proceeding: "Analytical Design of a Claw-Pole Motor for Electrical Water Pump Application," by H. Hembach, D. Gerling & E. Nipp; publ. 2007; pp. 1-6 (IEEE, Sebutal, Portugal).

* cited by examiner

FAN HAVING AN INTEGRATED IP PROTECTION

This application is a sec. 371 of PCT/EP03/01312, filed 11 Feb. 2003, claiming priority of DE 202 20 421 of 2 Mar. 2002.

FIELD OF THE INVENTION

The Ingress Protection (IP) standards for electrical machines are designated with abbreviations, e.g. safety standard IP23, according to which resistance to sprayed water from perpendicular or diagonal directions is required, or safety standard IP44, according to which resistance to splashed water from all directions is required. The present invention relates to a fan which is adapted to satisfy higher safety standards.

BACKGROUND

A fan generally has a fan housing with integrated reinforcing ribs, a base (also called a "flange") with bearings arranged therein, a securing mechanism for the rotor shaft, and a stator with a circuit board mounted on an adjacent flange. DE 200 12 673 U1 (assigned to Papst-Motoren and corresponding to EP 1,076,398) discloses such a fan, comprising essentially a stator, a lamination stack, a winding, a stator tube, a circuit board, and a rotor. The rotor comprises essentially rotor magnets, a rotor bell or cone on which fan blades are arranged, and a rotor hub.

In the case of electric motors which are installed in so-called "clean rooms" or in moist or aggressive environments, it is necessary to provide the sensitive parts of a motor, e.g. the winding and circuit board, with a protective layer or barrier, in order to satisfy high insulation and protection requirements, i.e. such a fan must have a specified kind of protection, depending upon its use.

Thus, it is known, for example from WO 98-19382 and corresponding U.S. Pat. No. 5,973,424, to coat the stator of a electric motor with plastic resin. The object of this disclosure is essentially to provide the connection between stator and circuit board in simpler form. Methods of creating such a protective coating, such as dipping, submerging, vacuum-impregnating, vacuum die-casting, and dripping-in, are known in the prior art.

Nevertheless, it is recognized that these methods not only require mechanical post-processing, but also fail to satisfy the requirements of the higher protection standards.

SUMMARY OF THE INVENTION

It is an object of the invention, to provide a fan configuration which facilitates integrated IP protection, preferably satisfying even the higher insulation and protection standards.

According to the invention, this object is achieved by mounting an internal stator on a bearing support tube, and then using a pot-shaped part, sealed to a base, to form a fluid-tight enclosure around the internal stator. Such a fan combines simple assembly and cost-effective, environmentally-conscious production with reliable functioning, even under difficult environmental conditions, and short cycle times are achieved in its manufacture.

Further advantages and features of the present invention will be apparent from the following embodiments described and illustrated in the drawings.

BRIEF FIGURE DESCRIPTION

Figure 2:
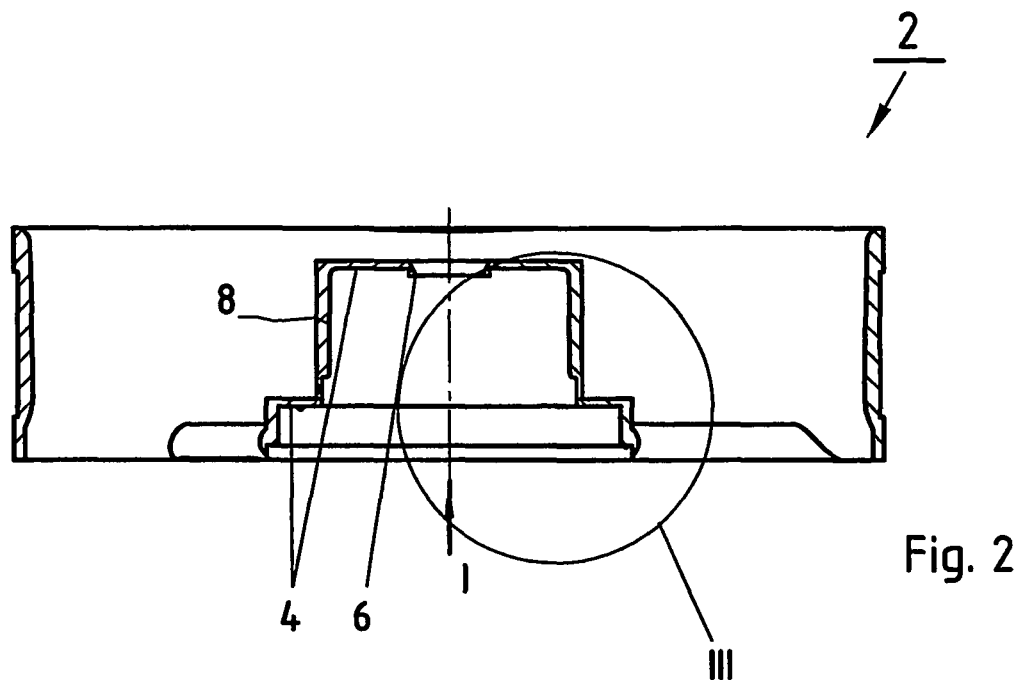
Figure 3:
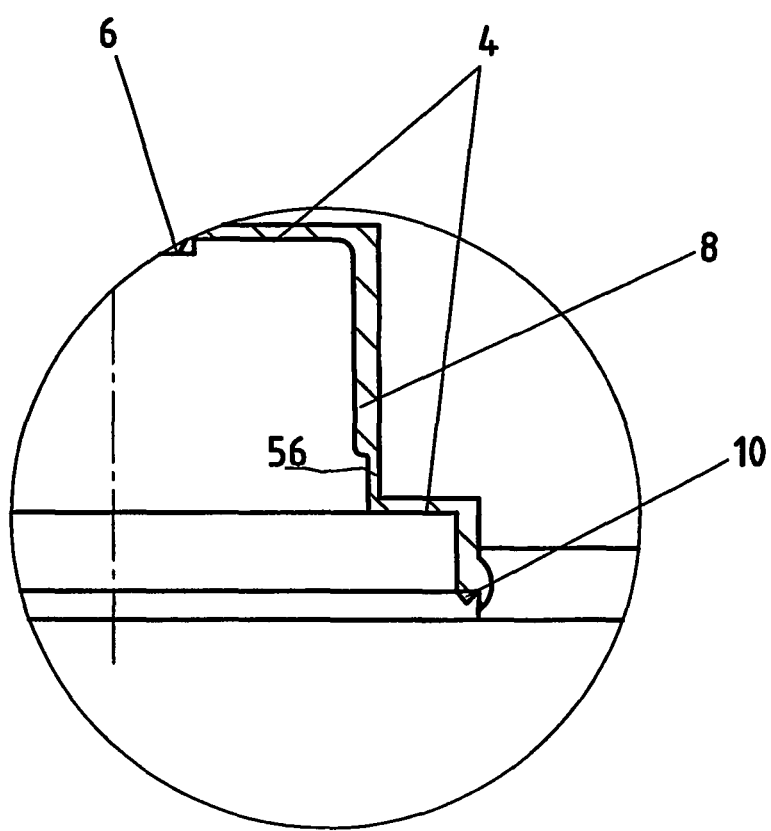
Figure 4:
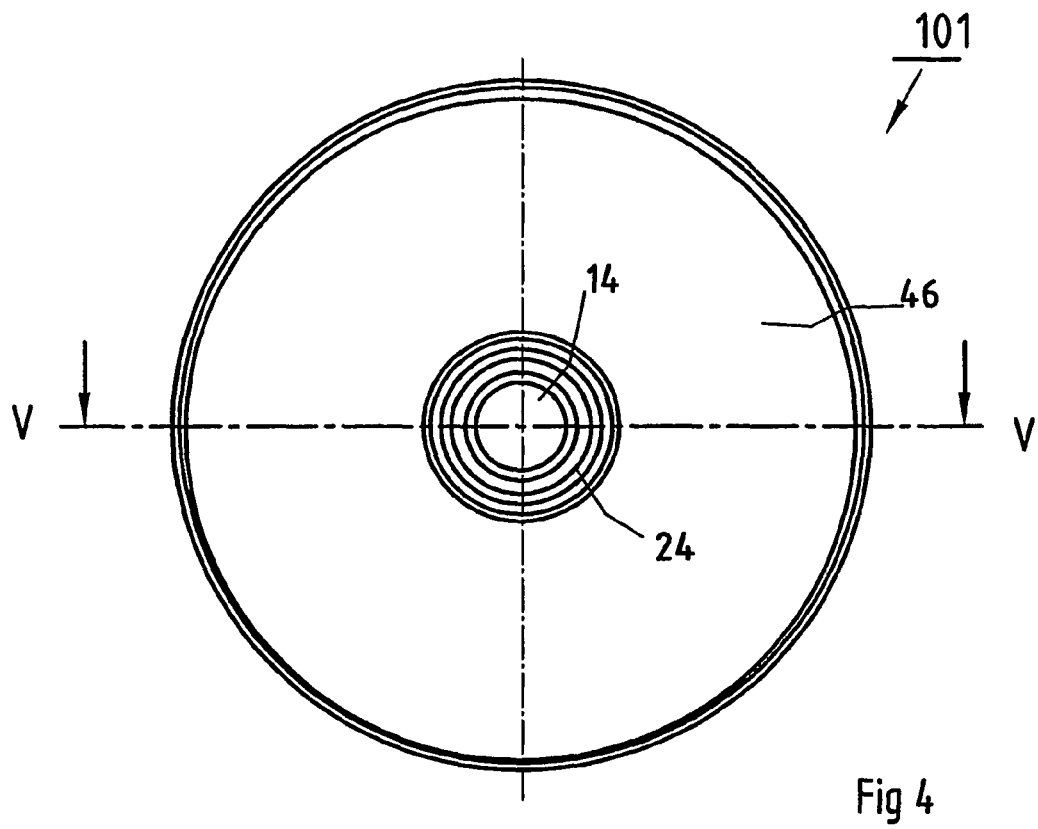
Figure 5:
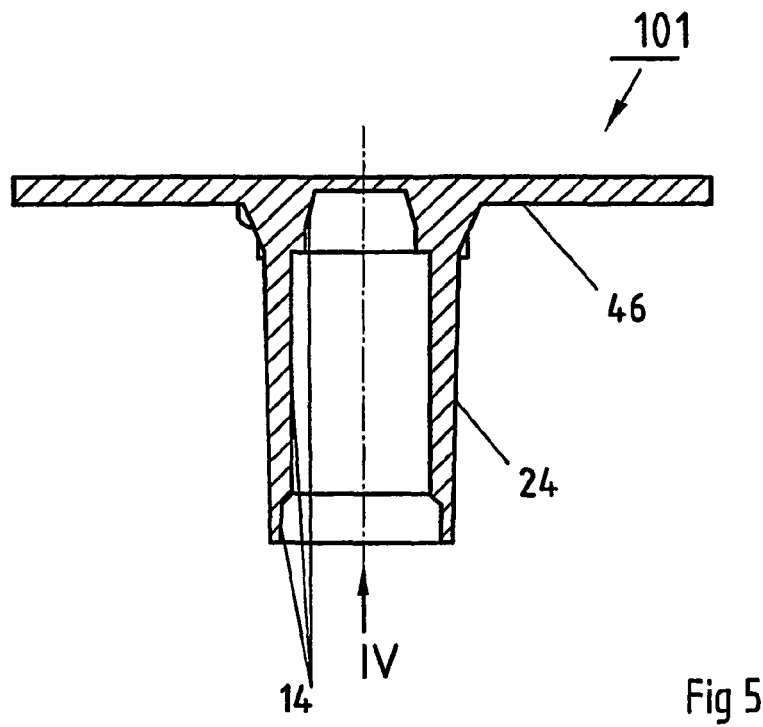
Figure 6:
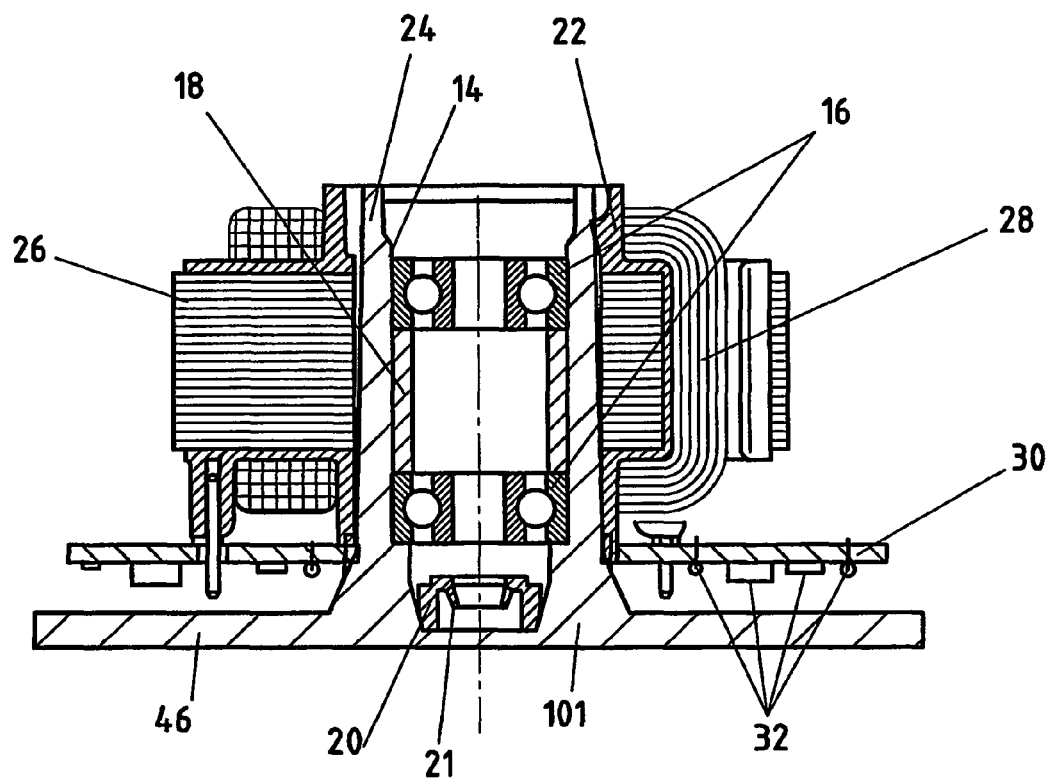
Figure 7:
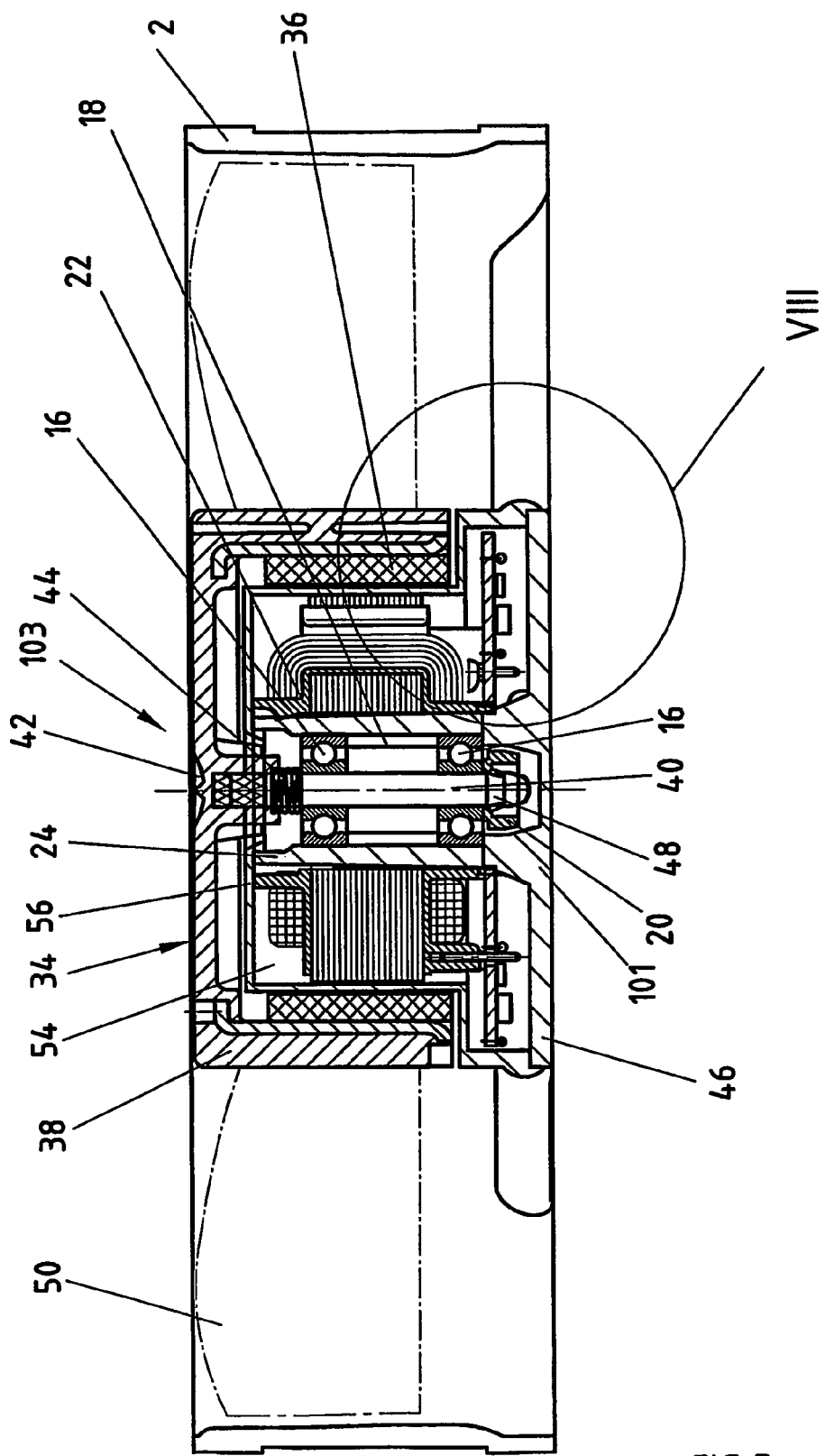
Figure 8:
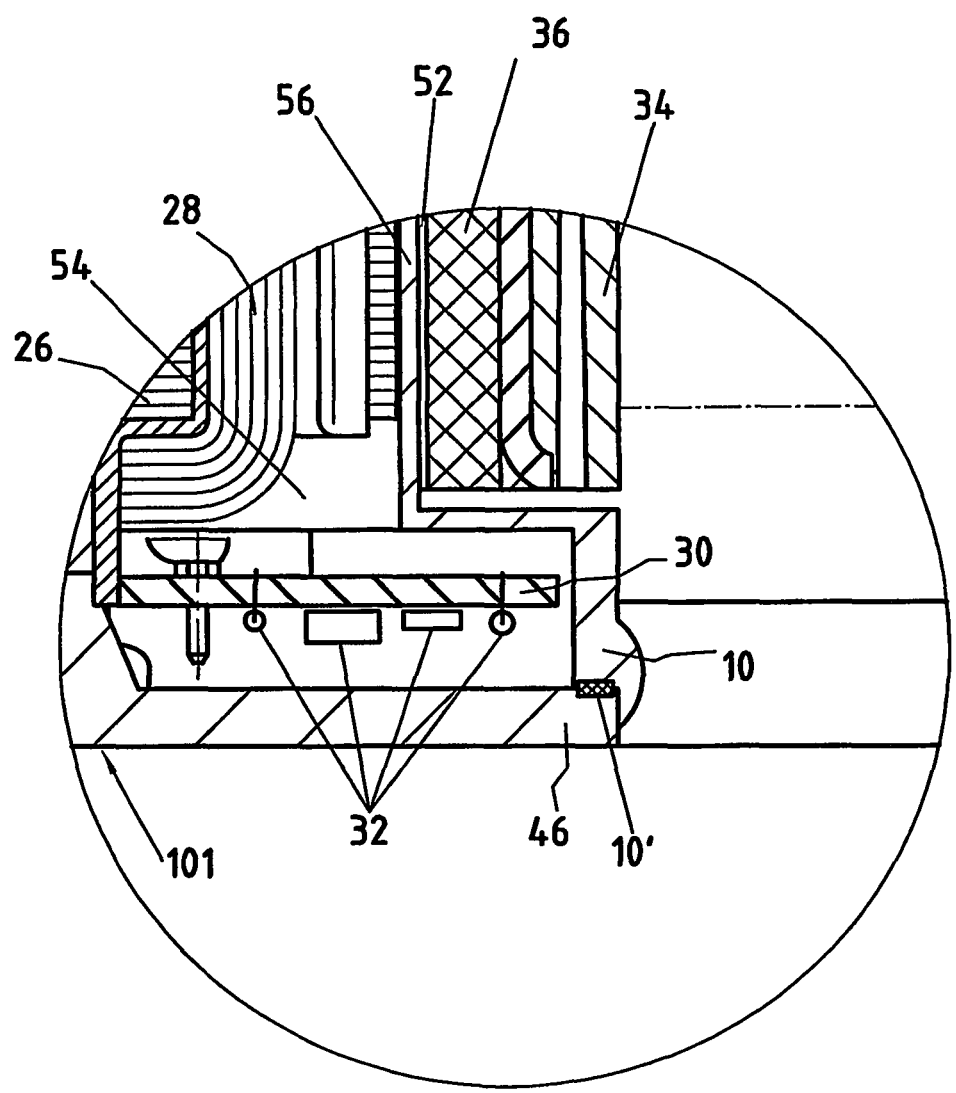
Figure 9:
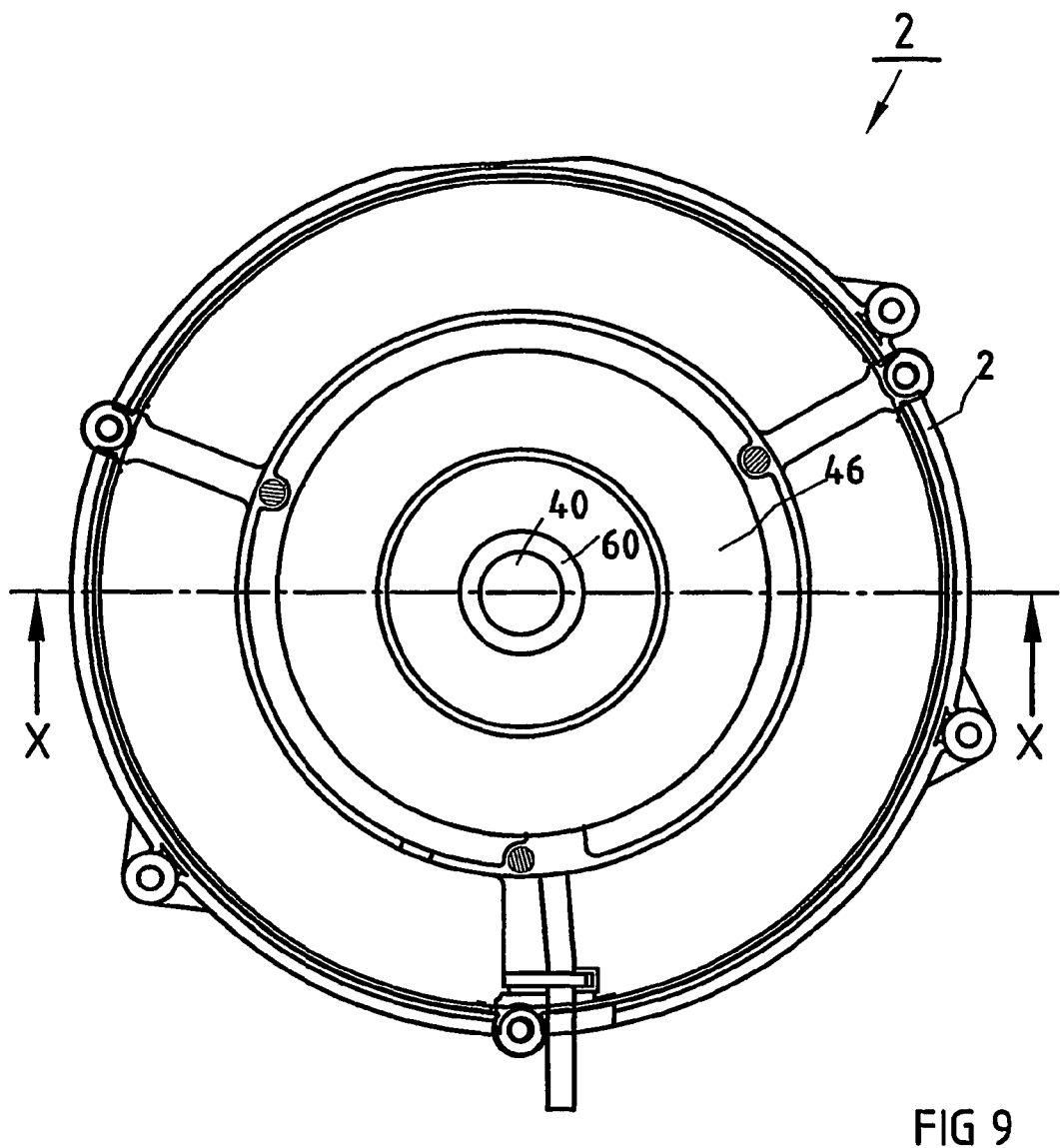
Figure 10:
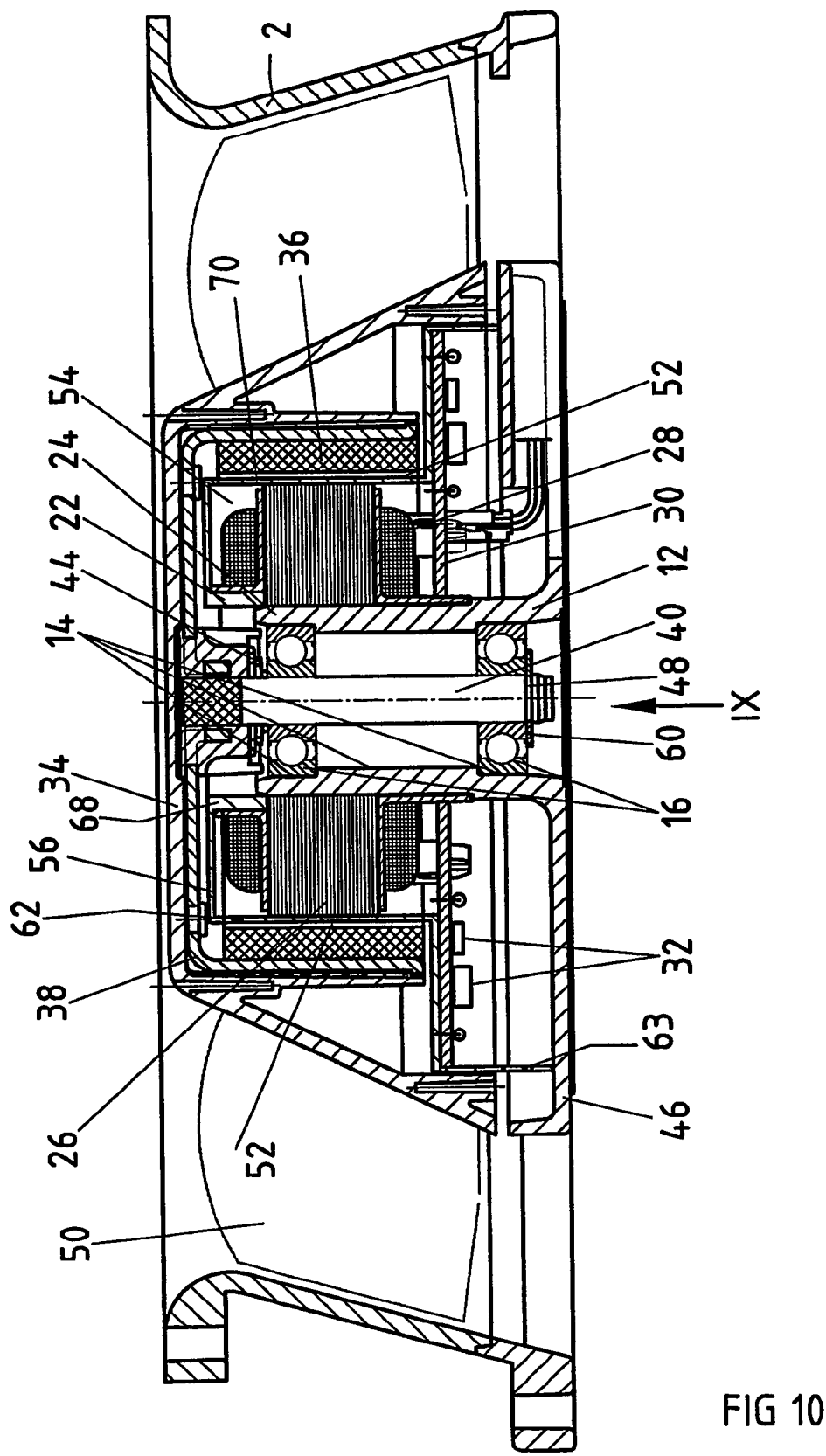
Figure 11:
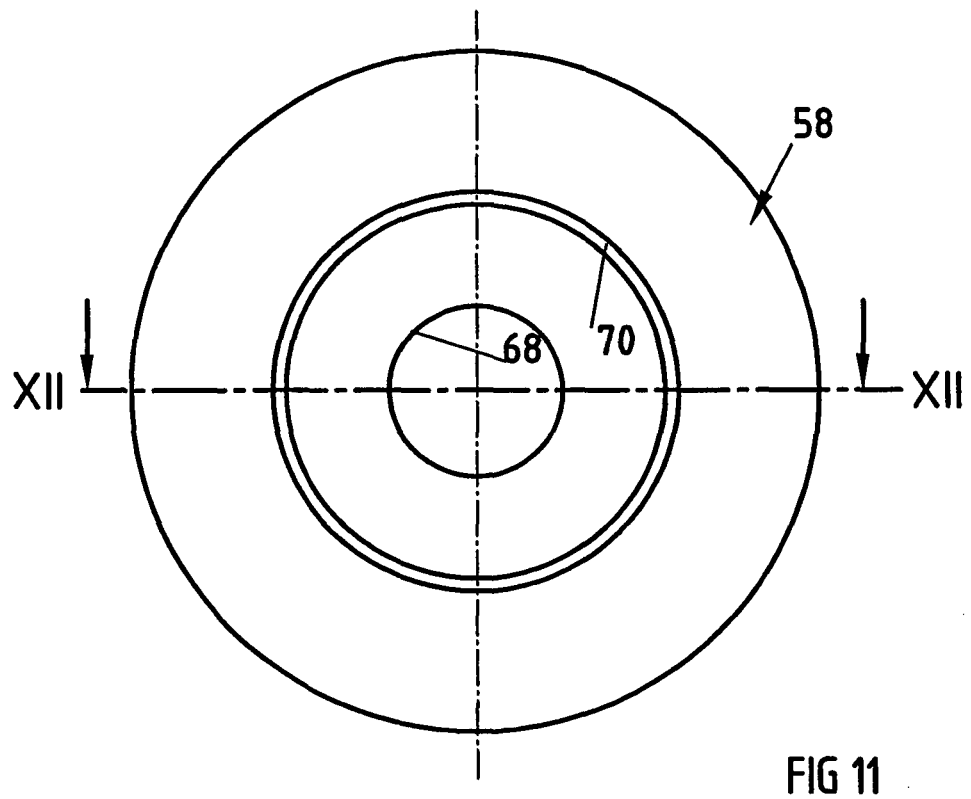

FIG. 1: a plan view of a fan housing of a first embodiment of the invention, looking along the direction of arrow 1 of FIG. 2;
FIG. 2: a section along line II-II of FIG. 1;
FIG. 3: an enlargement of detail III of FIG. 2;
FIG. 4: a plan view of a base, looking along direction IV of FIG. 5;
FIG. 5: a section along line V-V of FIG. 4;
FIG. 6: a section through a base with stator placed thereon;
FIG. 7: a section through a complete fan according to the first embodiment of the invention;
FIG. 8: an enlargement of detail VIII of FIG. 7;
FIG. 9: a plan view of a fan housing with a protective shroud, according to a second embodiment of the invention, along direction IX of FIG. 10;
FIG. 10: a section along line X-X of FIG. 9;
FIG. 11: a plan view of a cover cap, along direction XI of FIG. 12; and
FIG. 12: a section along line XII-XII of FIG. 11.

DETAILED DESCRIPTION

FIG. 1 and FIG. 2 illustrate a fan housing of a fan. Fan housing 2 has, on its rear side, multiple, essentially round pot-shaped recessed portions 4 with stepped respective diameters, whose walls are designated 56 (see FIGS. 2 & 3). The thus-created recessed portions are fixedly connected with the outer segments of fan housing 2. Additional, optional, reinforcing ribs 8 increase the stiffness of the pot-shaped recessed portions 4 and guarantee a non-wobbling seating of a stator base 101 in fan housing 2 (FIGS. 5 & 6). Inside the deepest pot-shaped recessed portion 4 there is provided, centrally located, an essentially round raised portion 6. It serves for positioning and fixation of stator base 101, as shown in FIG. 6. Additionally, there is a welding bead 10 on the outer side of one of the essentially round recessed portions 4, as shown in FIG. 3. Its purpose is explained in the following description.

FIGS. 4 and 5 show a base 101 in an unassembled state. Base 101, essentially round, has multiple annular concentrically arranged recesses 14, an essentially cylindrical bearing support tube 24 and a base portion 46. The latter is formed as a round plate or disc without through-holes, i.e. the recesses 14 are formed as a blind bore.

Base 101 (FIG. 5) is preferably made of plastic, e.g. from polyamide with 30% glass fiber reinforced plastic, but could, however, be made of other materials such as aluminum, steel, etc. Into this base 101, there is engaged a retaining clip 20, whose outer form is matched to the form of the recess 14, as shown, and which is provided, as shown, with detent hooks 21. Then, the ball bearings 16 and the spacer element 18 are pressed in.

Thereafter, according to FIG. 6, a stator 22 is shoved onto the bearing support tube 24, up to a predetermined end position. The securing of stator 22 into the required end position can be achieved by gluing or press-fitting. However, other fastening and fixing methods, such as clipping or using detent hooks, are possible. The fact that the mounting onto base 101 of the ball bearings 16, the spacer element 18, the retaining clip 20, the stator 22 and subsequently of the rotor 24 all are done from the same side, namely from above in FIG. 6, offers substantial advantages in terms of automation.

The completely component-mounted base 101 of FIG. 6 is subsequently slid into the underside of fan housing 2. The positioning and centering of base 101 is achieved by means of raised portion 6 (FIGS. 2 & 3), which is inside the concentrically arranged pot-shaped recessed portions 4 of FIG. 2. At this occasion, one of the recesses 14 (FIG. 5) of bearing support tube 24 engages with raised portion 6 (see FIG. 7).

FIG. 6 is a section through base 101 in the component-mounted state. This base 101 has, within recess 14, the two ball bearings 16, the spacer 18, and the retaining clip 20. Stator 22 is separately placed onto the essentially round bearing support tube 24. Stator 22 comprises essentially a lamination stack 26, a winding 28, and a circuit board 30. On the circuit board 30 are found electronic components 32 which could be destroyed by moisture and aggressive media, such as salt-laden air.

FIG. 7 illustrates, in section, the structure of a fan according to the first embodiment of the invention. The fan comprises the fan housing 2, the completely component-mounted base 101 with the ball bearings 16, the spacer 18, the retaining clip 20 and an electronically commutated external rotor motor (ECM) 103 essentially comprising stator 22 and rotor 34. The rotor 34 comprises essentially a rotor magnet 36, a rotor bell 38, a rotor shaft 40 securely anchored to the rotor bell, and a rotor hub 42. Rotor 34 is arranged substantially in a state of magnetic equilibrium relative to stator lamination stack 26, in order to reduce or minimize magnetic force operating, in an axial direction, between rotor 34 and stator 22.

FIG. 8 shows, greatly enlarged, how wall segment 56 of pot-shaped recessed portion 4 is arranged in air gap 52 in the manner of a canned motor, and insulates stator 22 from rotor 34.

The pre-mounted base 101 is, during assembly, slipped so far into the underside of fan housing 2, until base portion 46 of base 101 abuts the welding bead 10, as shown in FIG. 8.

Fan housing 2, with inserted base 46, is subsequently passed through an ultrasonic welding device. In this, the welding bead 10 is heated up, and brought to the melting point. Due to the dead weight of base 46 or due to supplemental pressure on the base, it assumes its final position on the underside of fan housing 2. After hardening of the melted welding bead 10' (FIG. 8), the base part 46 of base 101 is fluid-tightly and securely connected to the underside of fan housing 2. Base 101 can also be secured on the underside of fan housing 2 by gluing, press-fitting, or other methods. The preferred securing method for base 101 is a function of the material used for the fan housing and for the base.

On the opposing face of the housing rear wall of fan housing 2, a compensating spring 44 is installed centrally; see FIG. 7. The rotor bell 38 with rotor magnet 36 and fixedly anchored rotor shaft 40 is thereafter inserted into the housing. In the process, the compensating spring 44 is compressed, and the shaft 40 is inserted so far that the detent hooks 21 of retaining clip 20 engage in a circumferential groove 48 of the rotor shaft 40. The rotor shaft 40 and the rotor bell 38 connected therewith, and the injection-molded fan blades 50 are thereby secured axially with respect to stator 22. The compensating spring 44 serves to absorb axial play between rotor 34 and stator 22, to assist assembly in the manner illustrated, and for tensioning of the ball bearings 16.

According to the first embodiment, stator 22, together with circuit board 30, is enclosed on its upper side (as shown in FIGS. 6 & 7) by pot-shaped element 4, whose wall 56 extends through the air gap 52 (see FIG. 8) and forms an annular space 54 enclosing the inner stator 22. Element 4 is, at its open end, fluid-tightly connected to base part 46, as shown in FIG. 8. The upper (as shown in FIGS. 6 & 7) end of bearing support tube 24, whose lower end is closed, forms a connection with raised portion 6 of pot-shaped element 4, and the shaft 40 passes through this portion 6. One thereby obtains a cost-effective insulation of the stator of stator 22 with very good characteristics.

FIGS. 9 through 12 illustrate a second embodiment of a fan with integrated IP protection. For parts which are identical to those of FIG. 1, or identically operative, the same reference numerals are used. The fan has a fan housing 2 with a molded-on base 12; see FIG. 10. This base 12 comprises essentially a base part 46 and a bearing support tube 24 formed with one or more centrally arranged recesses 14. Into the bearing support tube 24, ball bearings 16 are press-fitted, as shown. Thereafter, the stator 22, complete with the lamination stack 26, the winding 28 and the circuit board (including electronic components 32) are slid onto the bearing support tube 24. Stator 22 is slid onto the bearing support tube 24 until it reaches a specific predetermined end position. In this end position, stator 22 is secured to the bearing support tube by press-fitting, gluing or other securing means.

Subsequently, a cover cap 58 (FIGS. 11 & 12), which is essentially round, is reverse-drawn over the stator 22. After its mounting over stator 22, cover cap 58 rests on base part 46 of base 12 (see FIG. 10) and is secured in this end position to fan housing 2, e.g. by adhesion. Thereby, cover cap 58 forms, together with fan housing 2, a fluid-tight enclosure. Subsequently, a compensating spring 44 is installed, centrally with respect to the fan housing rear wall. A rotor bell 38, with rotor magnet 36 and fixedly anchored rotor shaft 40, are then introduced into the housing. In the process, compensating spring 44 is compressed, and the shaft 40 is brought so far into bearing support tube 24 that a circumferential groove 48 of the rotor shaft 40 becomes visible on the rear side of fan housing 2. Then a securing ring 60 is engaged into the circumferential groove 48 of rotor shaft 40. Thereby, rotor shaft 40, and the rotor bell 38 having molded-on fan blades 50, are secured axially with respect to stator 22. The compensating spring 44 serves to absorb axial play between rotor 34 and stator 22 and biases the ball bearings 16 relative to each other. After the assembly, the opening of bearing support tube 24 is closed off in the manner shown, e.g. by a type or model plate.

Figure 12:
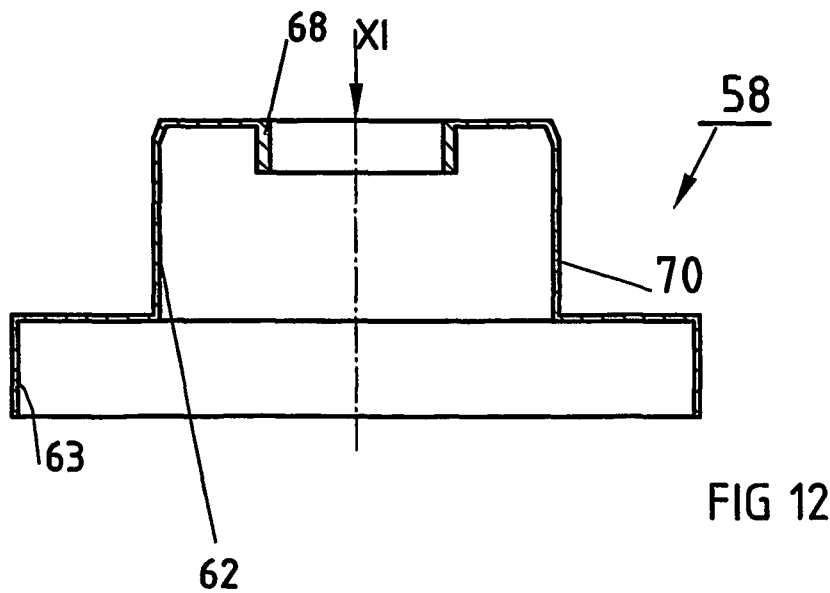

FIGS. 11 & 12 illustrate the open-ended cover cap 58. This has one or more centrally aligned, essentially round, pot-shaped recesses 62. In addition, there is a central through-hole 68, formed with a collar, which enables the rotor shaft 40, after the assembly of the fan, to pass through the housing. The free end of bearing support tube 24 projects into this collar of through-hole 68, as shown in FIG. 10, forming a seal therewith. A cylindrical segment 70 of cover cap 58 extends, in the manner of a canned motor, through the air gap 52 of the motor; see FIG. 10.

An advantage of the invention is that, with this arrangement, one can manufacture cost-effectively in an environmentally responsible manner. There are enormous savings in materials and time, and short cycle times on the production line. Further, in the manufacture of the stators, and the associated necessary Ingress Protection (IP), no polyurethane potting compounds or associated tools are needed. Defects such as blowholes, fissures, and voids, which occur with the conventional methods, are avoided. Subsequent time-consuming reworking is thus also avoided. Further, this method is well adapted for mass production, since it can be quickly and efficiently adapted for making varied models.

The invention is not limited to the embodiments shown and described, but rather encompasses all similarly operating variations and modifications.

The invention claimed is:

1. A fan, comprising:
   an external-rotor motor (103) having an internal stator (22) and an external rotor (34) separated therefrom by an air gap (52);
   a bearing support tube (24) mounted on a base (46), the internal stator (22) being mounted on the support tube (24);
   and
   a pot-shaped part (4, 56; 58, 70) having one end connected to said base (46), forming a substantially fluid-tight annular space (54) enclosing said internal stator (22), and having a wall (56; 70) which extends in the manner of a canned motor through said air gap (52) between the internal stator (22) and the external rotor (34),
   and wherein
   an end of said bearing support tube (24), which is remote from said base (46), extends to a portion (6; 68) of said pot-shaped part and forms a substantially fluid-tight connection therewith.

2. The fan of claim 1, wherein
   said base-remote end of said bearing support tube (24) connects by a plug-in connection with said portion (6; 68) of said pot-shaped part.

3. The fan of claim 1, wherein
   the base (46) forms a substantially fluid-tight connection (10') with a fan housing (2).

4. The fan of claim 1, wherein
   said base (46) is fluid-tightly connected to the fan housing (2) by ultrasonic welding.

5. The fan of claim 1, wherein
   said pot-shaped part (4; 56) has a welding bead (10) for formation of a welded connection.

6. The fan of claim 1, wherein said bearing support tube (24) is formed with a recess (14) in which
   a spacer (18),
   a retaining element (20) for securing the shaft, and
   a plurality of rotary bearings (16)
   are provided.

7. The fan of claim 6, wherein
   said recess (14) of the bearing support tube (24) is configured as a blind bore (14).

8. The fan of claim 6, wherein
   the recess (14) of the bearing support tube (24) is so configured, at its closed end, that it radially guides a retaining clip (20) placed therein.

9. The fan of claim 6, wherein
   the rotor is configured as an external rotor (34) with a rotor bell (38) onto which a rotor shaft (40) is secured;
   between the rotor bell (38) and an inner ring of one of the rotary bearings (16), a spring (44) is provided, which is compressible during assembly, to facilitate engagement of a retaining clip (20) placed in the recess (14) of the bearing support tube (24) into a circumferential groove (48) formed on the rotor shaft (40).

10. The fan of claim 9, wherein the retaining clip (20) has at least one detent hook (21) which, in an assembled state, engages into the circumferential groove (48) formed on the rotor shaft (40).

11. The fan of claim 1, wherein
    the motor is an electronically commutated motor (103) whose rotor (34) has a rotor magnet (36) and has a stator (22) with a stator lamination stack (26), the stator being arranged, at least partially, radially inside the rotor magnet (36).

12. The fan of claim 11, wherein the rotor (34) is arranged substantially in magnetic equilibrium relative to stator lamination stack (26), in order to reduce or avoid any axially directed magnetic force between rotor (34) and stator (22).

13. The fan of claim 1, wherein
    the pot-shaped part is integrally formed with the housing of the fan.

14. The fan of claim 1, wherein
    the base (46) connected to the bearing support tube (24) is integrally formed with the housing (2) of the fan.

15. The fan of claim 1, wherein
    a fluid-tight connection between the pot-shaped part and base (46) is achieved by adhesion.

16. The fan of claim 1, wherein
    the rotor (34) has a shaft (40) which is axially fixed by a securing ring (60) which engages into a circumferential groove of the shaft (40).

17. The fan of claim 1, wherein
    a fluid-tight connection between the pot-shaped part and base (46) is achieved by welding.

18. The fan of claim 1, wherein
    said bearing support tube (24) is formed with a recess (14) in which a spacer (18), a retaining element (20) for securing the shaft (40), and a plurality of rotary bearings (16) are provided.

19. The fan of claim 18, wherein said recess (14) of the bearing support tube (24) is configured as a blind bore (14).

* * * * *